US009531206B2

(12) United States Patent
Tsai et al.

(10) Patent No.: US 9,531,206 B2
(45) Date of Patent: Dec. 27, 2016

(54) PROTECTIVE COVER AND PROTECTIVE COVER SET WITH WIRELESS CHARGING FUNCTION

(71) Applicant: ASUSTeK COMPUTER INC., Taipei (TW)

(72) Inventors: Ming-Ting Tsai, Taipei (TW); Wei-Chen Tu, Taipei (TW); Hsiang-Jue Hung, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 214 days.

(21) Appl. No.: 14/493,979

(22) Filed: Sep. 23, 2014

(65) Prior Publication Data

US 2015/0084589 A1 Mar. 26, 2015

(30) Foreign Application Priority Data

Sep. 24, 2013 (CN) .......................... 2013 1 0439939

(51) Int. Cl.
  *H02J 7/00* (2006.01)
  *H02J 7/02* (2016.01)
  *G06F 1/26* (2006.01)

(52) U.S. Cl.
  CPC .............. *H02J 7/0042* (2013.01); *G06F 1/26* (2013.01); *H02J 7/0027* (2013.01); *H02J 7/0052* (2013.01); *H02J 7/025* (2013.01)

(58) Field of Classification Search
  USPC ....................................................... 320/108
  See application file for complete search history.

(56) References Cited

U.S. PATENT DOCUMENTS

| 2012/0169276 | A1* | 7/2012 | Wang | H02J 7/0042 320/108 |
| 2013/0063083 | A1* | 3/2013 | Park | H02J 7/0013 320/108 |
| 2013/0063873 | A1* | 3/2013 | Wodrich | G06F 1/1635 361/679.01 |
| 2013/0162205 | A1* | 6/2013 | Nakamura | B60L 11/182 320/108 |

FOREIGN PATENT DOCUMENTS

| CN | 201656576 U | 11/2010 |
| CN | 102694423 A | 9/2012 |
| TW | M433012 U1 | 7/2012 |

* cited by examiner

*Primary Examiner* — Robert Grant
(74) *Attorney, Agent, or Firm* — Muncy, Geissler, Olds & Lowe, P.C.

(57) ABSTRACT

A protective cover cooperating with a wireless charging dock is provided. The protective cover includes a first cover and a second cover. An electronic device is disposed at the first cover and electrically connected thereto. The second cover is connected to the first cover and thus the second cover can cover the first cover. The second cover includes at least one folding line and at least one charging module, and the charging module receives the inducting power from the wireless charging dock. The second cover can be folded along the folding line to form a folding state. The charging module includes a state sensing module, a power compensating module and a control module. The charging module can adjust a power compensating value and transmit the power compensating value to the wireless charging dock.

9 Claims, 8 Drawing Sheets

PROTECTIVE COVER AND PROTECTIVE COVER SET WITH WIRELESS CHARGING FUNCTION

CROSS-REFERENCE TO RELATED APPLICATION

This application claims the priority benefit of CN application serial No. 201310439939.3, filed on Sep. 24, 2013. The entirety of the above-mentioned patent application is hereby incorporated by reference herein and made a part of specification.

BACKGROUND OF THE INVENTION

Field of the Invention

The invention relates to a protective cover and, more particularly, to a protective cover and a protective cover set with a wireless charging function.

Description of the Related Art

As wireless charging technology becomes popular, it is widely applied to electronic devices, such as a smart phone, a video player or a camera. The safety regulation and compatibility between different systems should be taken into consideration when a charging device provides stable and high power to the electronic device.

Conventional wireless charging system includes at least one transmitting end and one receiving end. Both the transmitting end and the receiving end include a coil. Alternative current is provided via the transmitting end, the receiving end collects the near-field inducting power, and a rectifier and a voltage adjusting circuit are used to convert the alternative current to direct current. In order to control the power transmission, the receiver should communicate with the transmitter continuously to inform the required power, electric quantity and a timing of stop power transmission.

Moreover, if a metal object exists between the transmitting end and the receiving end in the power transmission process, the metal object is heated by the electromagnetic waves from the transmitting end. Thus, the metal object may scorch the user or damage the electronic device. In order to solve the problem, a wireless charging system usually includes a foreign object detection (FOD) function. It can detect whether a metal object exists between the transmitting end and the receiving end by calculating the power loss between the transmitting end and the receiving end. If the power loss is larger than a predetermined value, it can be determined that a metal object exists between the transmitting end and the receiving end, and when the temperature of the metal object exceeds a predetermined temperature due to the power absorbed by the metal object, the transmitting end stops providing power.

Most electronic devices include metal components, but the metal components would cause power loss. In order to avoid the misjudgment due to those metal components, an FOD adjusting value is usually matched with a resistance to ground as a power compensation value to offset the power loss caused by the metal components of the electronic device. However, different electronic devices have different compensation values. That means, an electronic device with a wireless charging function can only charge itself, which is rather inconvenient.

BRIEF SUMMARY OF THE INVENTION

A protective cover with a wireless charging function is provided. An electronic device without a receiving end can cooperate with a wireless charging dock by disposing the receiving end at the protective cover of the electronic device. Moreover, even though a folding state of the protective cover is adjusted, an FOD function still runs normally.

The protective cover includes a first cover and a second cover. An electronic device is disposed at the first cover and electrically connected thereto. The second cover is connected to the first cover and can cover the first cover. The second cover includes at least one folding line and a charging module, and the second cover is folded along the folding line to form a folding state. The charging module receives inducting power from the wireless charging dock.

The charging module includes a state sensing module, a power compensating module, a control module and a charging module. The power compensating module is electrically connected to the state sensing module, and the control module is electrically connected to the power compensating module.

In detail, the state sensing module generates a state sensing signal according to the folding state of the second cover. The power compensating module generates a power compensating signal according to the state sensing signal. The control module adjusts a power compensating value according to the power compensating signal and transmits the power compensating value to the wireless charging dock.

A protective cover set with a wireless charging function is also provided. The protective cover set includes the protective cover and the wireless charging dock as stated above, and the charging module of the protective cover receives the inducting power from the wireless charging dock.

These and other features, aspects and advantages of the present invention will become better understood with regard to the following description, appended claims, and accompanying drawings.

DETAILED DESCRIPTION OF THE EMBODIMENTS

A protective cover and a protective cover set with a wireless charging function are illustrated with relating figures. The same symbols denote the same components, and in order to make the invention easy to understand, components which are not directly related are omitted.

Figure 1:
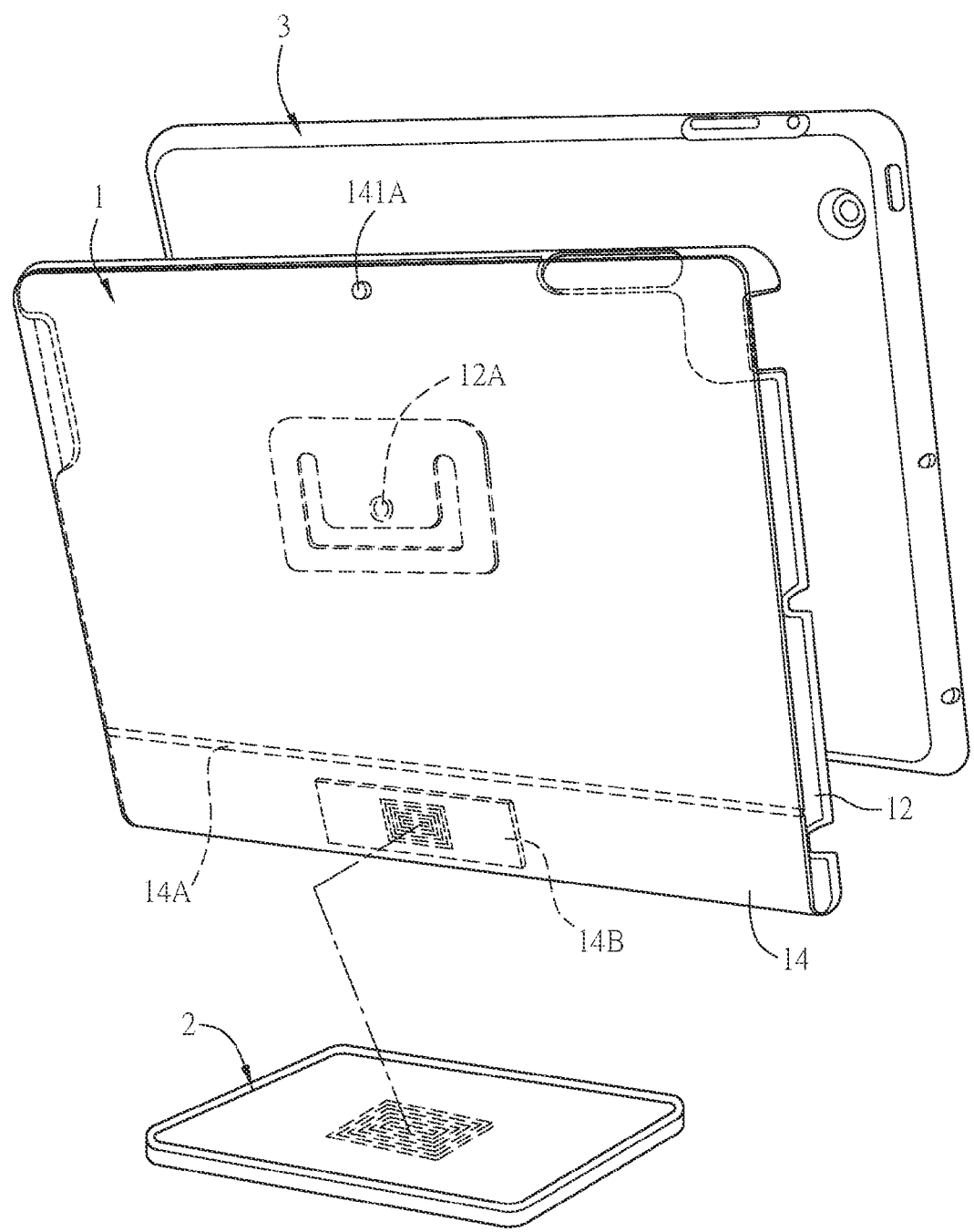
FIG. 1 is a schematic diagram showing a protective cover in the first folding state in a first embodiment.
Figure 2:
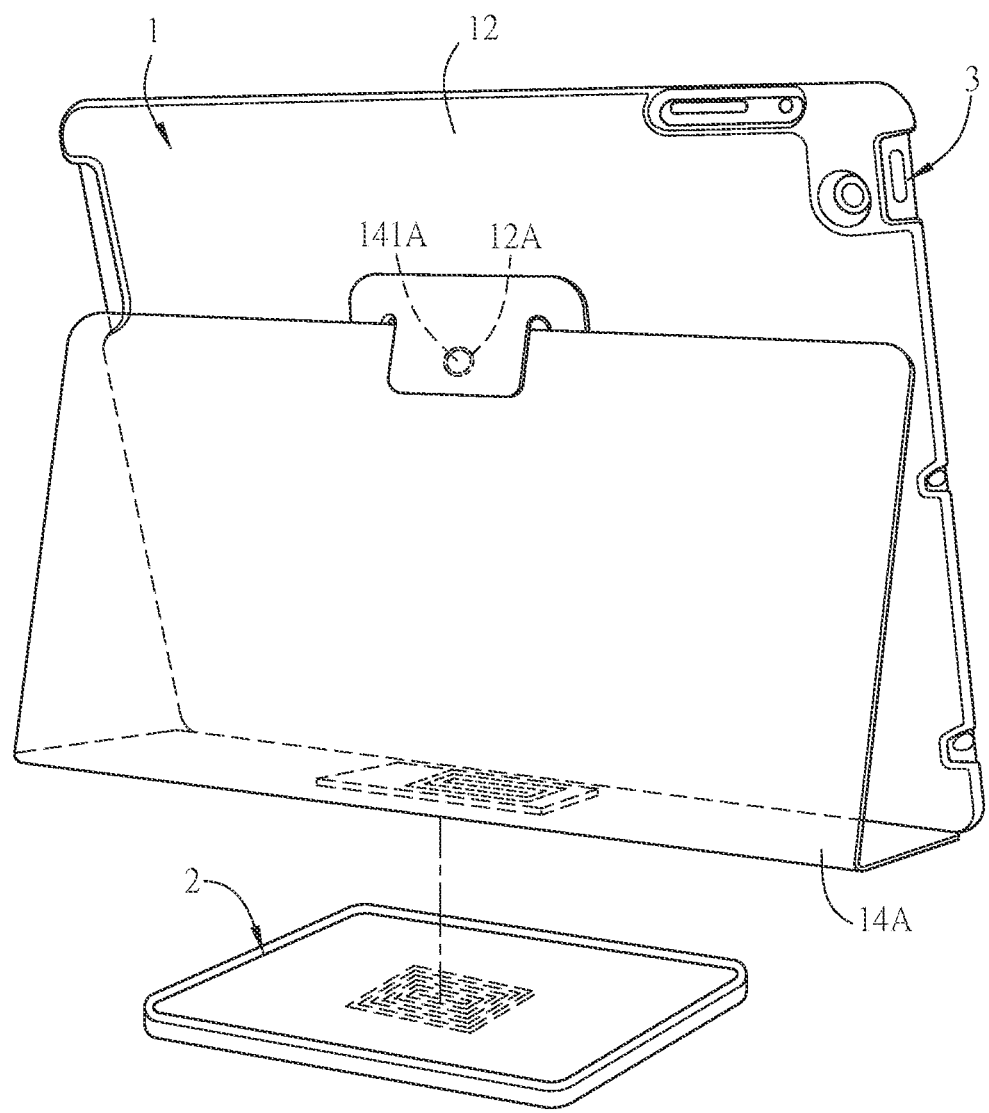
FIG. 2 is a schematic diagram showing a protective cover in the second folding state in the first embodiment.
Figure 3:
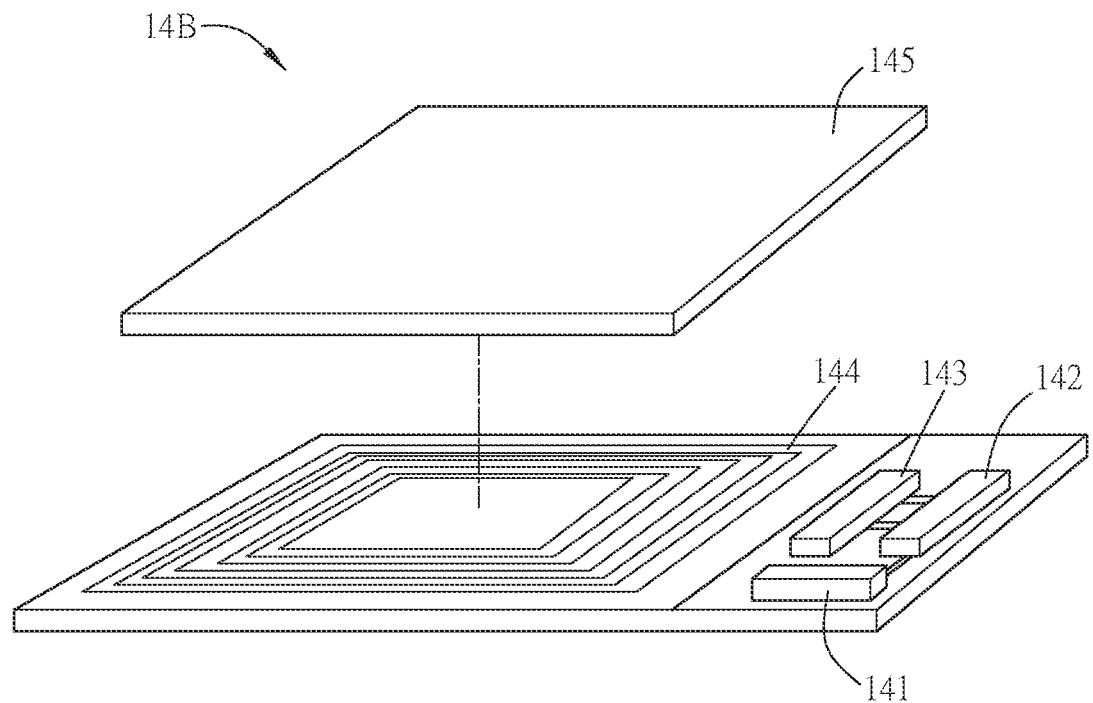
FIG. 3 is a partial enlarged view showing a charging module in FIG. 2.
Figure 4A:
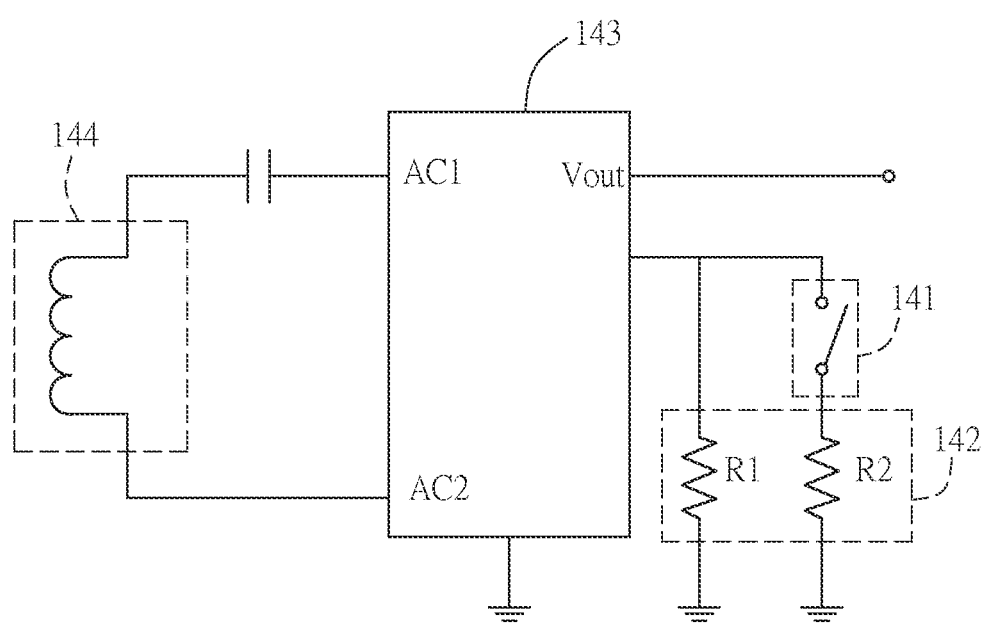
FIG. 4A is a schematic diagram showing a circuit of a charging module in the first embodiment.

Please refer to FIG. 1 to FIG. 4A, FIG. 1 and FIG. 2 are schematic diagrams showing a protective cover in a first folding state and a second folding state in the first embodiment. FIG. 3 is a partial enlarged view showing a charging module in FIG. 2. FIG. 4A is a schematic diagram showing a circuit of a charging module in the first embodiment.

A protective cover 1 with a wireless charging function cooperates with a wireless charging dock 2. The protective cover 1 and the wireless charging dock 2 form a protective cover set, and the protective cover 1 receives the inducting power from the wireless charging dock 2.

The protective cover 1 includes a first cover 12 and a second cover 14. The electronic device 3 is disposed at the first cover 12 and is electrically connected to the protective cover 1. The second cover 14 is connected to the first cover 12 to cover the first cover 12. In the embodiment, the second cover 14 can be folded to cover a display screen of the electronic device 3 and protect the display screen.

The second cover 14 includes at least one folding line 14A and at least one charging module 14B. The second cover 14 can be folded along the folding line 14A to form different folding states. In the embodiment, the second cover 14 is not folded to form a first folding state (as shown in FIG. 1), and it is folded along the folding line 14A to form a second folding state (as shown in FIG. 2). The protective cover 1 receives the inducting power from the wireless charging dock 2 via the charging module 14B.

Only one charging module 14B is shown in the embodiment, and there also may be multiple charging modules 14B connected to each other in series according to requirements. Moreover, the disposing position of the charging module 14B is not limited.

Compared with the wireless charging module disposed in the electronic device, it is easier to calculate a power compensating value between a transmitting end and a receiving end when the charging module 14B is disposed in the protective cover 1, and the electronic device without a wireless charging module can cooperate with the wireless charging dock via the protective cover 1.

Please refer to FIG. 3, the charging module 14B includes a state sensing module 141, a power compensating module 142 and a control module 143. The power compensating module 142 is electrically connected to the state sensing module 141 and the control module 143, respectively. An attaching element 145 (such as a metal sheet, a magnetic sheet or a plastic sheet) may be disposed between the charging module 14B and the electronic device 3 to avoid affection on the electronic device when the charging module 14B operates. FIG. 3 only shows an inner connection of the charging module 14B, the configuration of a practical product or a circuit may be any well known type of construction and further detailed reference thereto is omitted herein.

The charging module 14B further includes at least one charging coil 144, a rectifier (not shown) and a voltage adjusting circuit (not shown). The rectifier and the voltage adjusting circuit may be disposed in the control module 143. The charging coil 144 receives and collects a magnetic field change and an electronic field change nearby to generate the inducting power, and provides the inducting power to the electronic device 3 via the rectifier and the voltage adjusting circuit. The inducting power may be provided via a transmission line (not shown). The transmission line is disposed in the second cover 14 and is electrically connected to the charging module 14B, and provides the inducting power to the electronic device 3. One end of the transmission line further includes a plug (such as a micro-USB plug), a magnetic probe joint and a connector for coupling the electronic device 3.

Please refer to FIG. 2 and FIG. 4A, the state sensing module 141 can generate a state sensing signal according to the folding state of the second cover 14. In other words, different folding states generate different state sensing signals. The state sensing module 141 includes at least one sensing element 141A. The first cover 12 further includes at least one auxiliary sensing element 12A, and the auxiliary sensing element 12A is disposed corresponding to the sensing element 141A. The sensing element 141A and the auxiliary sensing element 12A may be metal sheets, magnetic elements or sensors. When the resistance, the magnetic field or the inducing signal between the sensing element 141A and the auxiliary sensing element 12A is changed, a state sensing signal is generated.

Then, the power compensating module 142 receives the state sensing signal and generates a power compensating signal accordingly. The control module 143 receives the power compensating signal and adjusts a power compensating value according to the power compensating signal and sends the power compensating value to the wireless charging dock 2.

In the embodiment shown in FIG. 4A, the state sensing signal is generated when the sensing element 141A is connected to the auxiliary sensing element 12A. The power compensating signal is generated when a resistor R2 is conducted.

In the embodiment, when the second cover 14 is flatly attached to the first cover 12 to form the first folding state (as shown in FIG. 1), the auxiliary sensing element 12A at the first cover 12 does not attach to the sensing element 141A, and thus the state sensing module 141 does not conduct the resistor R2. The power compensating value of the protective cover is set to the resistance of R1.

After the control module 143 adjusts the power compensating value, the charging module 14B starts charging. If the calculated power loss is larger than a predetermined value (such as 250 mW) after the power compensating value at the first folding state is deducted, the wireless charging dock 2 determines that a metal object exists between the transmitting end and the receiving end. Thus, the control module 143 generates a stop signal, the wireless charging dock 2 stops supplying power, and the charging module 14B stops charging.

When the second cover 14 is folded to form the second folding state (as shown in FIG. 2), the auxiliary sensing element 12A of the first cover 12 is attached to the sensing element 141A. The resistor R2 is conducted, and the resistor R1 and the resistor R2 are connected in parallel to make the whole resistance decrease. The power compensating value of the protective cover is set from the resistance of R1 to the value R1*R2/(R1+R2).

The power compensating value in the embodiment is a resistance value, but it may also be a current value or a voltage value, which is not limited herein.

After the control module 143 adjusts the power compensating value, the charging module 14B starts charging. If the calculated power loss is larger than a predetermined value (such as 250 mW) after the power compensating value at the second folding state of the second cover 14 is deducted, the wireless charging dock 2 determines that a metal object exists between the transmitting end and the receiving end. Thus, the control module 143 generates a stop signal, the wireless charging dock 2 stops supplying power, and the charging module 14B stops charging. The control module 143 may be a micro-processor or a micro-chip, which is not limited herein.

In the embodiment, two resistors are connected in parallel, but in other embodiments, a variable resistor may be used. In other words, the control module can change the resistance of a variable resistor according to the power compensating signal, so as to change the power compensating value and achieve similar effect.

Figure 4B:
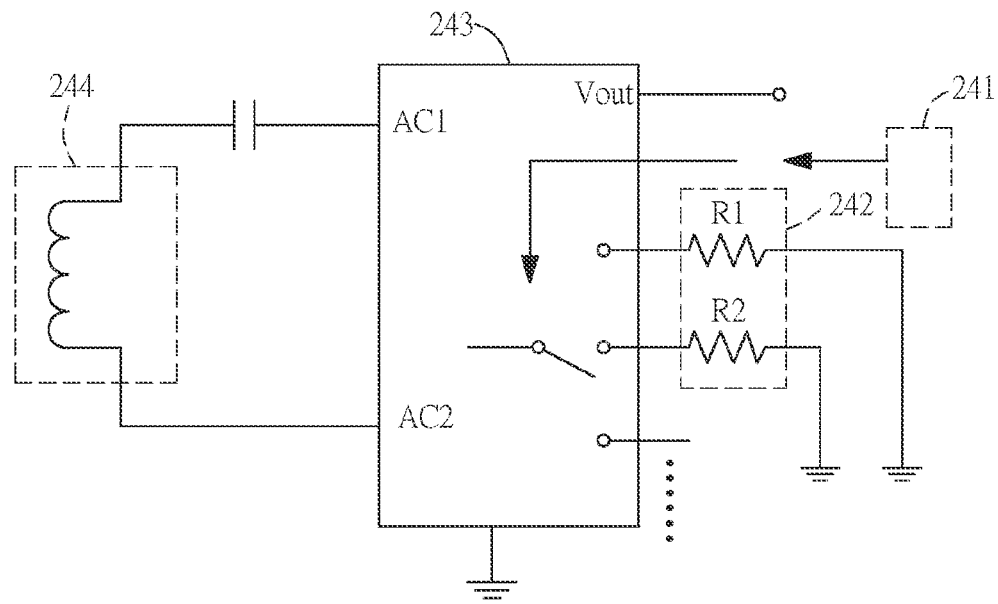
FIG. 4B is a schematic diagram showing a circuit of a charging module in the second embodiment.
Figure 4C:
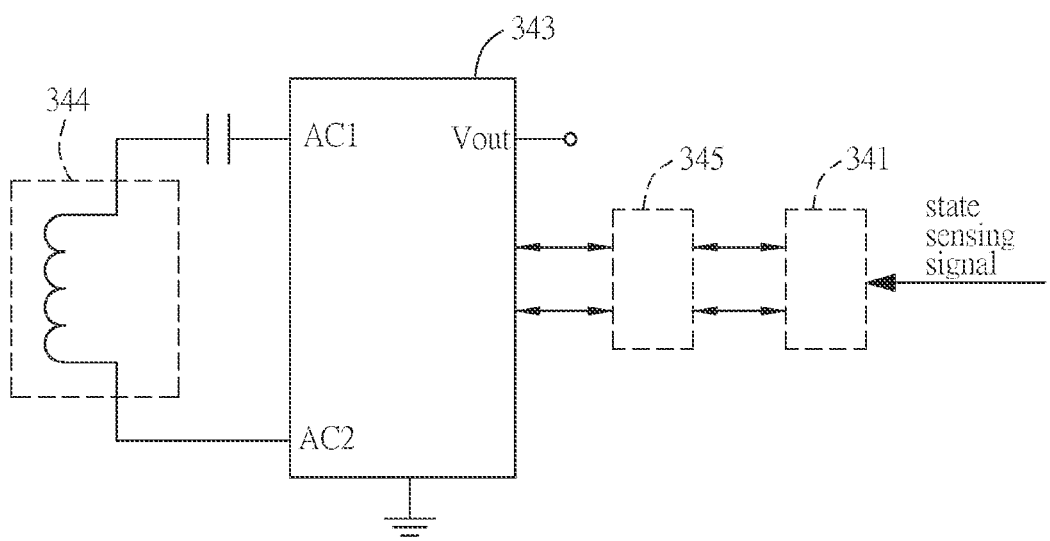
FIG. 4C is a schematic diagram showing a circuit of a charging module in the third embodiment.

FIG. 4B is a schematic diagram showing a circuit of a charging module in the second embodiment. FIG. 4C is a schematic diagram showing a circuit of a charging module in the second embodiment.

In the embodiment shown in FIG. 4B, the state sensing module 241 generates the state sensing signal according to the folding state of the second cover 14. The control module 243 receives the state sensing signal and directly couples a specific resistor accordingly to make the power compensating module 242 generate the power compensating signal, so as to adjust the power compensating value. In other words, please refer to FIG. 1 and FIG. 2, at the first folding state, the control module 243 couples the resistor R1, and at the second folding state, the control module 243 couples the resistor R2. Consequently, if the protective cover 1 has multiple folding ways, multiple groups of resistors are set to match with the folding states.

In the embodiment shown in FIG. 4C, the power compensating module 242 may be integrated to the control module 343. In detail, the difference is that the power compensating value is adjusted via an interface conversion module 345. The interface conversion module 345 receives the signals from the state sensing module 341, and adjusts the power compensating value via software parameters to achieve similar effect, but not via a physical component.

Additionally, although the state sensing module, the power compensating module and the control module are shown as different and independent components in the previous embodiments, they can also be integrated to one single chip.

Figure 5:
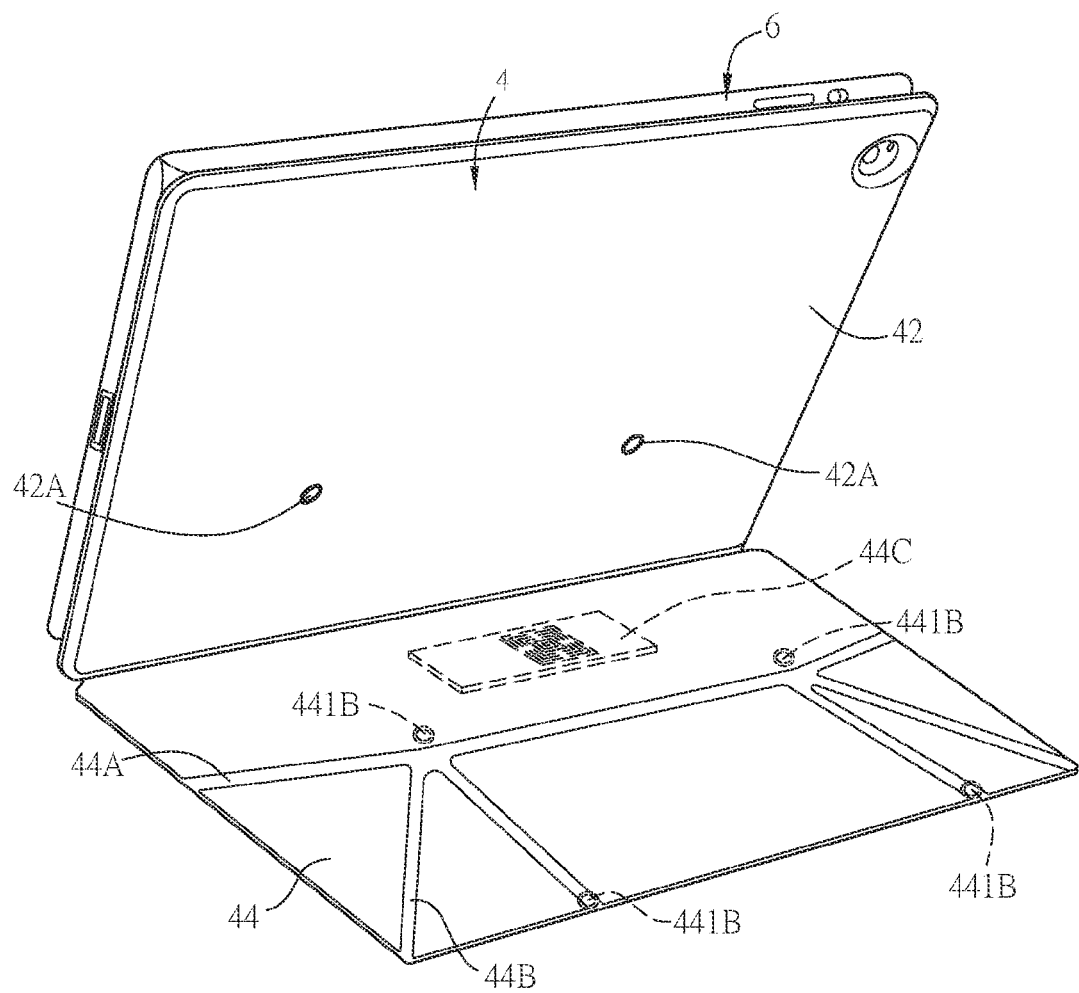
FIG. 5 is a schematic diagram showing a protective cover in the second embodiment.
Figure 6:
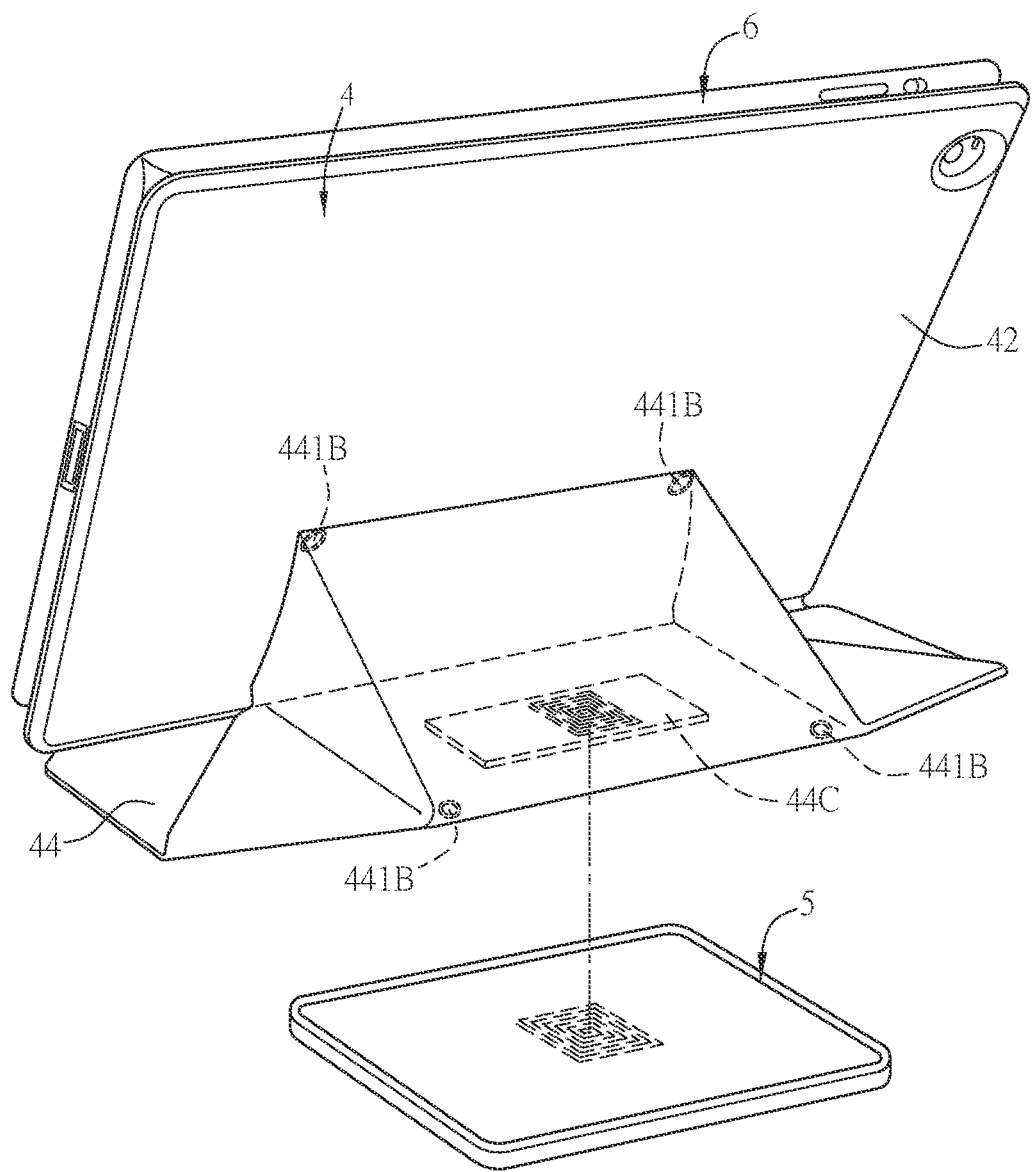
FIG. 6 is a schematic diagram showing a protective cover in the first folding state in the second embodiment.
Figure 7:
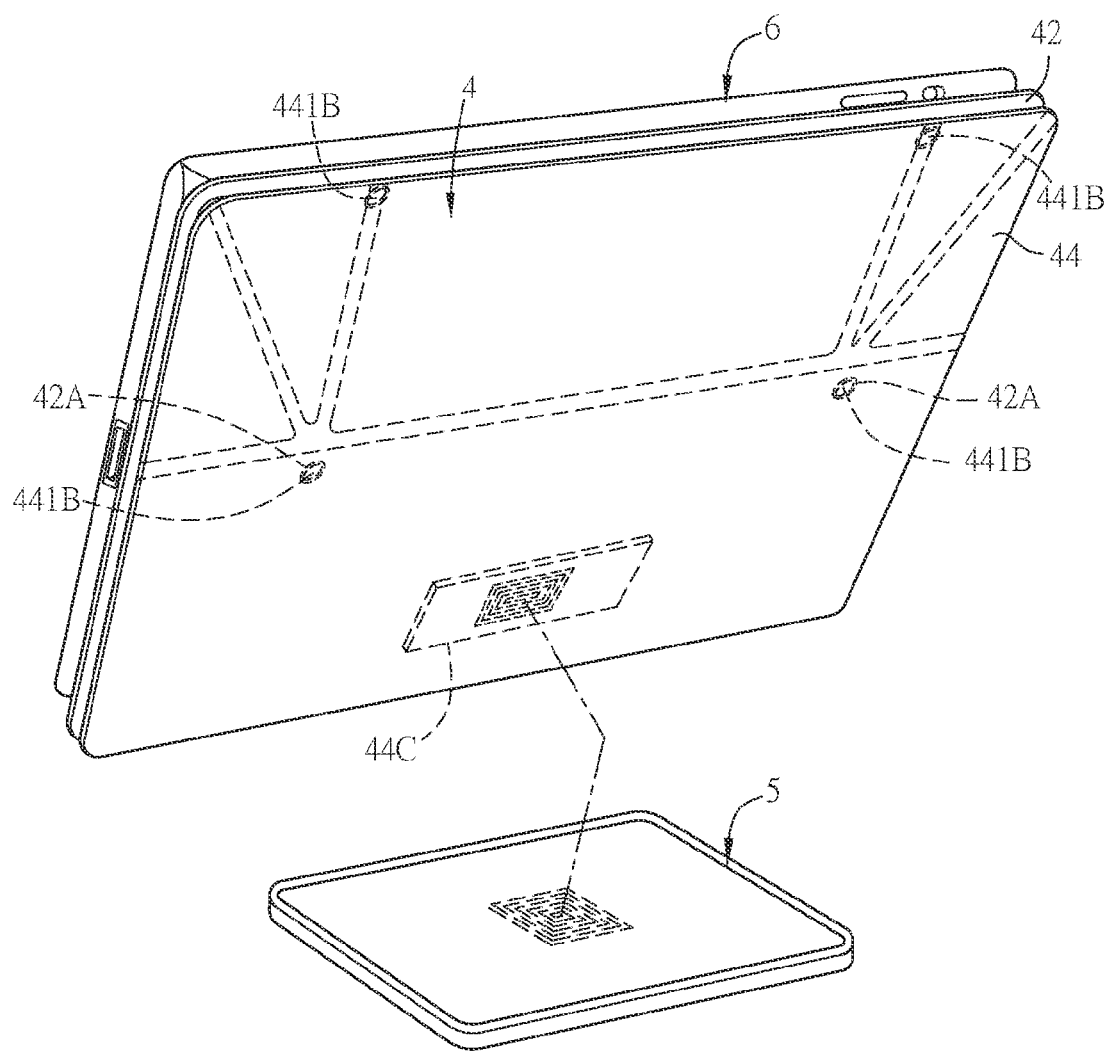
FIG. 7 is a schematic diagram showing a protective cover in the second folding state in the second embodiment.

Please refer to FIG. 5 to FIG. 7, FIG. 5 is a schematic diagram showing a protective cover in the second embodiment. FIG. 6 and FIG. 7 are schematic diagrams showing a protective cover in a first folding state and a second folding state in the second embodiment.

Similarly, the protective cover 4 in the embodiment includes a first cover 42 and a second cover 44. The electronic device 6 is disposed at the first cover 42 and is electrically connected to the protective cover 4. The second cover 44 is connected to the first cover 42 to cover the first cover 42. The protective cover 4 can cooperate with a wireless charging dock 5.

The difference between the second embodiment and the first embodiment is that the second cover 44 includes multiple folding lines 44A and 44B, and the state sensing module 441 of the charging module 44C includes multiple sensing elements 441B. The first cover 42 further includes multiple auxiliary sensing elements 42A.

The protective cover 4 can be folded in different ways to form different folding states. The folding states of the second cover 44 of the protective cover 4 can be transmitted via the sensing elements 441B and the auxiliary sensing elements 42A, and the state sensing signal is provided. The power compensating signal is generated according to the state sensing signal and is transmitted to the wireless charging dock 5.

Other components and the application states of the state sensing module, the power compensating module and the control module are similar with those in the first embodiment, which is omitted herein.

In sum, the power compensating value is adjusted via the wireless charging module disposed in the protective cover and the state sensing module which senses the folding state of the protective cover, and the power compensating value is then transmitted to the wireless charging dock. Thus, the protective cover not only conforms to a security specification, but also can be applied by an electronic device without a wireless charging module.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A protective cover with a wireless charging function, cooperating with a wireless charging dock, the protective cover comprising:

a first cover, electrically connected to a portable electronic device, wherein the electronic device is disposed at the first cover; and a second cover, connected to the first cover and covering the first cover, wherein the second cover includes at least one folding line and a charging module, the second cover is folded along different folding lines to form a plurality of folding states, each folding state corresponds to a power compensating value, the charging module receives an adjusted inducting power from the wireless charging dock according to the folding state of the second cover, and the charging module includes:

a state sensing module, generating a state sensing signal according to the folding state of the second cover;

a power compensating module, electrically connecting to the state sensing module and generating a power compensating signal according to the state sensing signal; and a control module electrically connected to the power compensating module, the control module adjusting a power compensating value according to the power compensating signal and transmitting the power compensating value to the wireless charging dock.

2. The protective cover according to claim 1, wherein the state sensing module includes at least a sensing element.

3. The protective cover according to claim 2, wherein the first cover further includes at least an auxiliary sensing element, the auxiliary sensing element is disposed corresponding to the sensing element.

4. The protective cover according to claim 1, wherein when a power loss is larger than a predetermined value, the control module generates a stop signal to stop charging by the charging module.

5. The protective cover according to claim 1, wherein the charging module further includes at least one charging coil, a rectifier and a voltage adjusting circuit.

6. The protective cover according to claim 1, wherein the control module is a micro-processor or a micro-chip.

7. The protective cover according to claim 1, wherein the protective cover further includes a transmission line, the transmission line is disposed at the second cover and electrically connected to the charging module to provide the inducting power to the electronic device.

8. The protective cover according to claim 1, wherein the second cover further includes an attaching element is disposed between the charging module and the electronic device.

9. A protective cover set with a wireless charging function, comprising:

a wireless charging dock; and a protective cover, wherein the protective cover includes a first cover and a second cover, a portable electronic device is disposed at the first cover and electrically connected thereto, the second cover is connected to the first cover to cover the first cover, the second cover includes at least one folding line and a charging module, the second cover is folded along different folding lines to form a plurality of folding states, each folding state corresponds to a power compensating value, the charging module receives an adjusted inducting power from the wireless charging dock according to the folding state of the second cover, and the charging module includes:

a state sensing module generating a state sensing signal according to the folding state of the second cover;

a power compensating module electrically connected to the state sensing module, and the power compensating module generating a power compensating signal according to the state sensing signal; and a control module electrically connected to the power compensating module, the control module adjusting a power compensating value according to the power compensating signal and transmitting the power compensating value to the wireless charging dock.

\* \* \* \* \*